No. 672,197.  
A. L. STEVENS.  
VEHICLE SPRING AND RUNNING GEAR.  
(Application filed Dec. 11, 1900.)  
(No Model.)  
Patented Apr. 16, 1901.  
2 Sheets—Sheet 1.
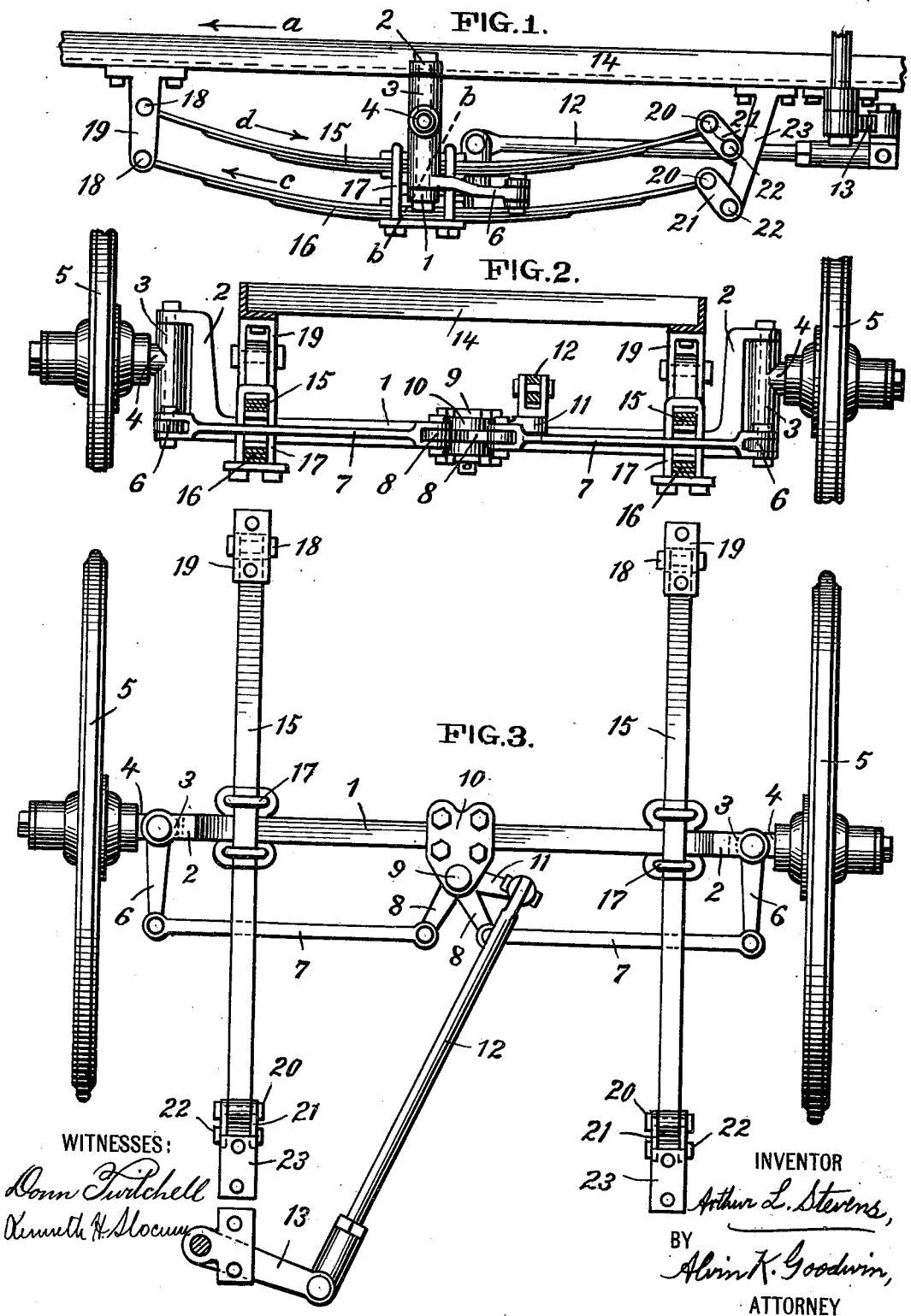
WITNESSES:  
INVENTOR  
Arthur L. Stevens,  
BY  
Alvin K. Goodwin,  
ATTORNEY

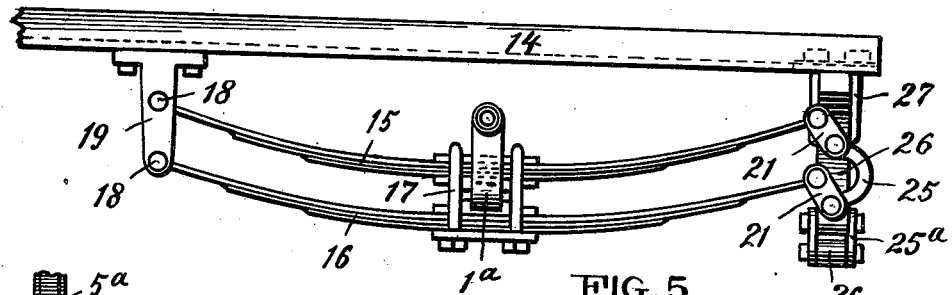
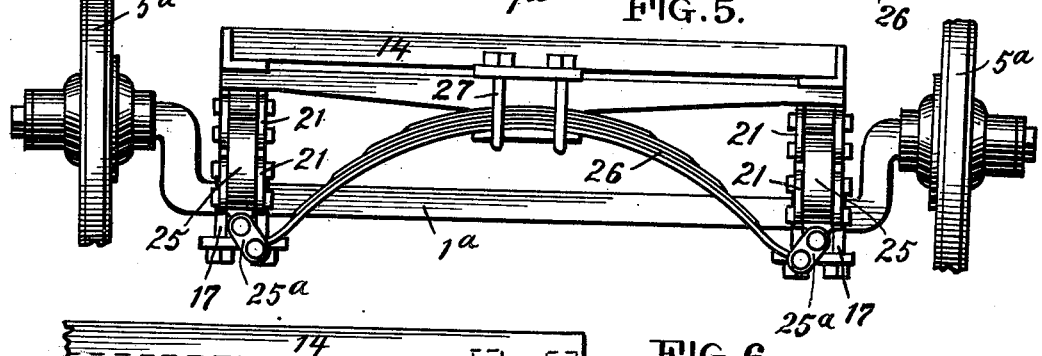
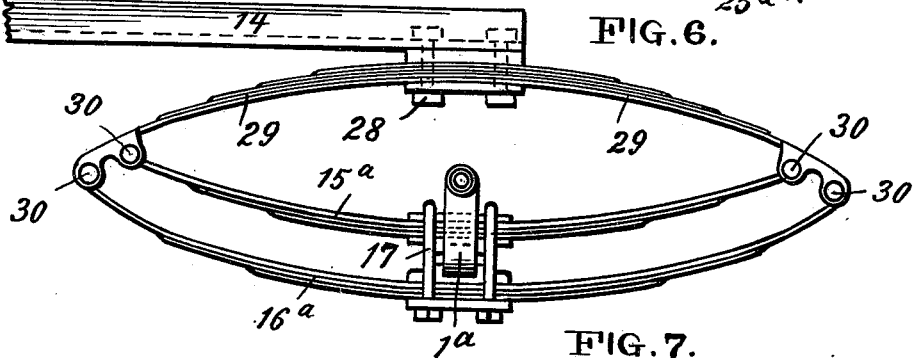
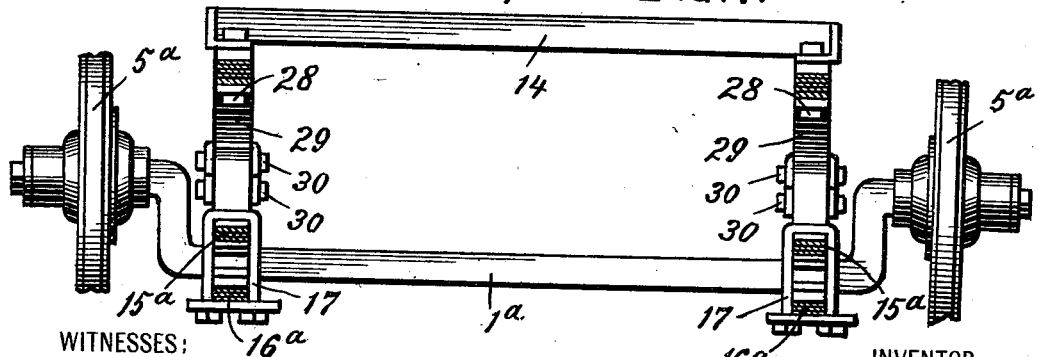

UNITED STATES PATENT OFFICE.

ARTHUR L. STEVENS, OF NEW YORK, N. Y.

VEHICLE SPRING AND RUNNING-GEAR.

SPECIFICATION forming part of Letters Patent No. 672,197, dated April 16, 1901.

Application filed December 11, 1900. Serial No. 39,466. (No model.)

*To all whom it may concern:*

Be it known that I, ARTHUR L. STEVENS, a citizen of the United States of America, residing at the borough of Manhattan, city of New York, State of New York, have invented certain new and useful Improvements in Vehicle Springs and Running-Gears, of which the following is a specification.

My invention relates more particularly to springs for sustaining the body of a vehicle from the running-gear or from an axle carrying vertically-pivoted steering-wheels. The invention is applicable to various classes and styles of vehicles, but is specially adapted for use in self-propelling or motor vehicles.

It is the more special object of my invention to provide springs most serviceable as side springs and having greater elasticity, strength, and durability than prior forms of vehicle-springs. At the same time my invention has peculiar advantages in simplifying the running-gear by dispensing with the reach or perch commonly used to brace front and rear axles from each other and in providing for absorbing or counteracting the torque of a low bent axle under the stress of the wheels and in permitting the vehicle-body to be set low on the running-gear to give increased stability and convenience in use and promote easy propulsion of the vehicle and in maintaining the integrity of the lapped laminal layers of the springs.

The invention will first be described and then will be particularly defined in claims hereinafter set forth.

Reference is made to the accompanying drawings, forming part of this specification, and in which—

Figure 1 is a side elevation of parts of a vehicle-axle with the vehicle-body sustained therefrom in one preferred manner by one arrangement of my improved springs. Fig. 2 is a rear sectional view thereof in the plane of the axle and also shows parts of the vertically-pivoted steering-wheels, and Fig. 3 is a sectional plan view of said springs and running-gear. Fig. 4 is a side elevation showing a modified arrangement of my invention as adapted to a platform-spring construction; and Fig. 5 is a rear end view thereof, showing parts of wheels on fixed ends of the cranked axle. Fig. 6 is a side view of another modification, showing how my improved springs may be connected to the vehicle-body by elastic supports which have the form of a semi-elliptic spring; and Fig. 7 is a rear sectional elevation of such modified springs and running-gear.

Referring now more particularly to Figs. 1, 2, and 3 of the drawings, the numeral 1 indicates the main body of the axle, having up-bent forked ends 2, in which are hung on vertical pivots the bearings 3 of stub-axles 4, sustained in the vehicle-wheels 5. Each bearing 3 has an arm 6, from which a rod 7 extends to another arm 8. Both arms 8 8 have a common pivot connection at 9 with a suitable yoke 10, fixed to the axle-body. The pivot 9 has an arm 11, from which proper connections 12 13 lead to any suitable tiller or device for turning both wheels 5 at once to steer the vehicle in well-known manner. I show but a small portion 14 of the vehicle-body, which may have any form or construction.

According to my invention I use for each spring two or more substantially parallel spring members fixedly held at central or intermediate parts to the axle-body or axle and so coupled to the vehicle-body as to form a truss of parts of the spring members between their ends and their connection with the axle, whereby mutual endwise reactionary resistance of the spring members upon each other is permitted while provision is made for full vertical action of the springs under varying weight of the vehicle-body and its load. I prefer to employ two superposed spring members, and I so illustrate the invention.

When the duplex or multiple member spring is used as a side connection between the running-gear and the vehicle-body, as shown in Figs. 1, 2, and 3 of the drawings, I preferably fasten the two substantially parallel spring members 15 16 centrally by suitable clips 17 to top and bottom faces of the axle-body 1. When a quite rigid connection of one end of these spring members is desired, I connect said ends by pivot-bolts 18 to a pendent bracket 19, fixed to the vehicle-body. The other ends of the spring members 15 16 are here coupled by pivots 20 to the one end of links 21, the other ends of which are pivoted by bolts 22 to a pendent bracket 23, fixed in the vehicle-body 14. It is obvious that with duplex or multiple member springs thus arranged any vertical twisting tendency or torque of the low cranked axle-body 1 due to traction or obstruction of the wheels 5 is compensated or corrected by the mutual reverse or reactionary endwise resistance of the truss portions of the two spring members between the axle and body connections at 17 19. For instance, supposing the vehicle is moving forward in direction of arrow $a$ in Fig. 1 of the drawings and the wheels 5 strike an obstruction, the tendency would be to twist the axle toward the inclined dotted line $b\ b$, thereby causing the lower spring member 16 to push forward on bracket 19 in direction of arrow $c$ and simultaneously causing the upper spring member 15 to pull backward on said bracket in direction of arrow $d$. As there is very little endwise movement of said truss portions of the spring members between the clip 17 and the bracket 19, the torque tendency of the axle will be almost wholly nullified by this mutual endwise reactionary resistance of the spring members. This mutual endwise resistance of the spring members causes the axle to be maintained in approximately true vertical position and so fully and elastically relieves the axle from injurious fore and aft strains that the reach or perch so commonly used to connect the front and rear axles of the vehicle running-gear may safely be dispensed with. Furthermore, this endwise reactionary resistance of the spring members maintains their leaf layers in perfect lap upon each other for their whole length as sharply contradistinguished from ordinary fore and aft full-elliptic or half-elliptic springs connecting the vehicle-body and axle. I have specially noticed that such elliptic springs under conditions of wheel resistance or obstruction above named are subjected to heavy and violent seesawing strains, which cause permanent separation of the spring-leaves from each other, thereby seriously impairing the symmetry, elasticity, and durability of the springs, all of which disadvantages are obviated by my improved spring construction.

It will also be noticed that my duplex or multiple member springs occupy but little vertical space, which makes them specially suitable for hanging vehicle-bodies low down on cranked axles to promote the general stability and easy running of the vehicle. Furthermore, the small vertical height of the springs permits them to be placed clear in under the vehicle-body and out of the way of steering-wheels mounted on vertically-pivoted stub-axles, thereby improving the appearance and facilitating easy control of the vehicle. Finally, my improved springs have far more elasticity than a single leaf-spring having like strength or carrying capacity, whereby they are adapted for use on almost any type of light or heavy vehicles, with the assurance of promoting the easy running and durability of the entire vehicle structure.

In Figs. 4 and 5 of the drawings the wheels $5^a$ are shown mounted on integral ends of the cranked axle $1^a$, and the spring members 15 16 are connected to said axle and to the bracket 19 on the vehicle-body 14 to form truss portions between said connections, substantially as in Figs. 1, 2, and 3 and above described. Instead, however, of connecting the rear ends of spring members 15 16 by yielding links to a bracket fixed to the vehicle-body I here show said rear ends of the spring members yieldingly coupled by links 21 to yokes 25, which in turn are coupled by links $25^a$ to opposite ends of a transverse half-elliptic spring 26, which is clipped at 27 to the vehicle-body and forms an elastic support for the rear ends of the two side spring members 15 16. These springs 15 16 15 16 and 26 together form a platform-spring arrangement suitable for various types of vehicles. The opposite side spring members 15 16 here have by their connected truss portions substantially the same endwise reactionary resistance functions and advantages as above indicated for the spring arrangement of Figs. 1 to 3 of the drawings, with the added advantage of increasing the elasticity of the connection between the running-gear and body of the vehicle by coupling one end of each spring member 15 16 to the transverse yielding support or spring 26 on the vehicle-body.

In Figs. 6 and 7 of the drawings I show two superposed spring members $15^a\ 16^a$ clipped at 17 to the axle $1^a$. As distinguished from the modification shown in Figs. 4 and 5, these spring members are connected at both ends to a yielding support fixed at 28 to the vehicle-body 14. This support may conveniently take the form of a half-elliptic spring 29, having two pairs of ears at each end, to which the ends of the spring members are pivotally connected at 30, one member being slightly shortly than the other to accommodate this particular structure. As a whole this spring structure has the general appearance of a full-elliptic spring, with an interior member ranging about parallel with one of the outer half portions. In this case both end portions of the two springs $15^a\ 16^a$ between the axle connection 17 and the opposite end pivots 30 form an endwise reactionary resistance truss, and the vertically-elastic connection 29 has sufficient endwise rigidity to cause this truss resistance of parts $15^a\ 16^a$ to compensate for torque of the axle and make a reach unnecessary and avoid separation of the spring-leaves, substantially as above described for the other forms of the invention, while at the same time the two spring members $15^a\ 16^a$ and their elastic support 29 will together yield vertically under varying weight of the vehicle-body and its load. In this spring structure I prefer to make the upper arched elastic connection 29 about as heavy as both the spring members 15ª 16ª, so as to approach as nearly as possible an equal vertical resistance and elasticity throughout the whole spring structure. These spring structures 15ª 16ª 29 may with advantage be used at the rear of vehicle-bodies having as a front support the low side springs 15 16, (shown in Figs. 1, 2, and 3 of the drawings,) whereby the whole spring-support of a vehicle-body will be materially improved by comparison with the ordinary spring-mountings of vehicle running-gear.

I am aware of a prior spring structure in which reactionary resistance of two spring members upon each other braces the wheel-axle to which said members are connected and makes the use of a reach between front and rear axles unnecessary; but this spring structure is very different from mine. In my structure all the superposed duplex or multiple spring members extend both fore and aft from their clip-fastenings at the axle to the couplings, which connect them to the vehicle-body. Hence one of my spring members does not serve mainly as an endwise brace between the axle and the vehicle-body, leaving the other spring member or members to sustain practically the whole of the load, as in the prior spring structure. In the preferred arrangement of my spring both or all of its members have substantially the same strength and elasticity from their axle-clip connection to their ends, thus assuring maximum degree of elasticity with ample strength to support the load and reducing to a minimum the wear and tear on the whole vehicle.

I claim as my invention—

1. A duplex or multiple member vehicle-spring, comprising two or more substantially parallel spring members clipped at intermediate parts to the vehicle-axle and extending fore and aft therefrom, and connections between the ends of said spring members and the vehicle-body permitting mutual endwise reactionary resistance of said spring members upon each other, substantially as and for the purposes described.

2. A duplex or multiple member spring, comprising two or more substantially parallel spring members having substantially similar degree of elasticity and clipped at intermediate parts to the vehicle-axle and extending fore and aft therefrom, and connections between the ends of said spring members and the vehicle-body permitting mutual endwise reactionary resistance of said spring members upon each other, substantially as and for the purposes described.

3. A duplex or multiple member vehicle-spring, comprising two or more substantially parallel spring members clipped at intermediate parts to the vehicle-axle and extending fore and aft therefrom, and connections including yielding or elastic portions between the ends of said spring members and the vehicle-body permitting mutual endwise reactionary resistance of said spring members upon each other, substantially as and for the purposes described.

4. In combination with a cranked axle having lower body portion and higher end portions receiving the vehicle-wheels, duplex or multiple member springs each comprising two or more substantially parallel spring members clipped at intermediate parts to the low axle-body and extending fore and aft therefrom, and connections between the ends of said spring members and the vehicle-body permitting mutual endwise reactionary resistance of said spring members upon each other, substantially as and for the purposes described.

5. In combination with a cranked axle having lower body portion and higher end portions receiving the vehicle-wheels, duplex or multiple member springs each comprising two or more substantially parallel spring members clipped at intermediate parts to the low axle-body and extending fore and aft therefrom, and connections including yielding or elastic portions between the ends of said spring members and the vehicle-body permitting mutual endwise reactionary resistance of said spring members upon each other, substantially as and for the purposes described.

6. Vehicle springs and running-gear, comprising an axle-body having stub-axles vertically pivoted to its ends, steering-wheels on said stub-axles, means controlling said steering-wheels, duplex or multiple member springs each comprising two or more substantially parallel spring members clipped at intermediate parts to the axle-body and extending fore and aft therefrom, and connections between the ends of said spring members and the vehicle-body permitting mutual endwise reactionary resistance of said spring members upon each other, substantially as and for the purposes described.

7. Vehicle springs and running-gear, comprising an axle having lower body portion and higher end portions, stub-axles vertically pivoted to said axle-body ends, steering-wheels mounted on said stub-axles, means controlling said steering-wheels, duplex or multiple member springs each comprising two or more substantially parallel spring members clipped at intermediate parts to the axle-body and extending fore and aft therefrom, and connections between the ends of said spring members and the vehicle-body permitting mutual endwise reactionary resistance of said spring members upon each other, substantially as and for the purposes described.

8. Vehicle springs and running-gear, comprising a vehicle-body having opposing spring-supports, links pivoted to one of each pair of said opposing supports, the vehicle-axle, and duplex or multiple member springs each comprising two or more substantially parallel spring members clipped at intermediate parts to the axle and extending fore and aft therefrom and coupled directly at their one end to one support on the vehicle-body and coupled at their other ends to the links which are pivoted to the opposing support on the vehicle-body, substantially as and for the purposes described.

9. Vehicle springs and running-gear, comprising a vehicle-body having opposing spring-supports, links pivoted to one of each pair of said opposing supports, the vehicle-axle, and duplex or multiple member springs each comprising two or more substantially parallel spring members having substantially similar degree of elasticity, and clipped at intermediate parts to the axle and extending fore and aft therefrom and coupled directly at their one end to one support on the vehicle-body and coupled at their other ends to the links which are pivoted to the opposing spring-support on the vehicle-body, substantially as and for the purposes described.

10. Vehicle springs and running-gear, comprising a vehicle-body having opposing spring-supports, links pivoted to one of each pair of said opposing supports, the vehicle-axle including a body portion and stub-axles pivoted at the ends thereof, steering-wheels on said stub-axles, means controlling said steering-wheels, and duplex or multiple member springs each comprising two or more substantially parallel spring members clipped at intermediate parts to the axle-body and extending fore and aft therefrom and coupled directly at their one end to one support on the vehicle-body and coupled at their other ends to the links which are pivoted to the opposing support on the vehicle-body, substantially as and for the purposes described.

11. Vehicle springs and running-gear, comprising a vehicle-body having opposing spring-supports, links pivoted to one of each pair of said opposing supports, the vehicle-axle including a lower body portion and higher end portions, stub-axles vertically pivoted to said axle-body ends, steering-wheels mounted on said stub-axles, means controlling said steering-wheels, and duplex or multiple member springs each comprising two or more substantially parallel spring members clipped at intermediate parts to the axle-body and extending fore and aft therefrom and coupled directly at their one end to one support on the axle-body and coupled at their other ends to the links which are pivoted to the opposing support on the vehicle-body, substantially as and for the purposes described.

ARTHUR L. STEVENS.

Witnesses:
   ALBERT J. DOTY,
   THOMAS A. DE LONG.